United States Patent [19]

Okochi et al.

[11] Patent Number: 5,142,628
[45] Date of Patent: Aug. 25, 1992

[54] MICROCOMPUTER SYSTEM FOR COMMUNICATION

[75] Inventors: Toshio Okochi; Takeshi Miyazaki, both of Ohme, Japan

[73] Assignee: Hitachi, Ltd., Tokyo, Japan

[21] Appl. No.: 501,418

[22] Filed: Mar. 28, 1990

Related U.S. Application Data

[63] Continuation of Ser. No. 137,063, Dec. 23, 1987, abandoned.

[30] Foreign Application Priority Data

Dec. 26, 1986 [JP] Japan .................................. 61-308449

[51] Int. Cl.[5] .............................................. G06F 13/00
[52] U.S. Cl. ...................................... 395/325; 364/239; 364/239.2; 364/242.3; 364/242.31; 364/242.1; 364/232.8
[58] Field of Search ... 364/200 MS File, 900 MS File

[56] References Cited

U.S. PATENT DOCUMENTS

| | | | |
|---|---|---|---|
| 4,159,532 | 6/1979 | Getson, Jr. et al. | 364/900 |
| 4,358,825 | 11/1982 | Kyu et al. | 364/200 |
| 4,471,427 | 9/1984 | Harris | 364/200 |
| 4,542,457 | 9/1985 | Mortensen et al. | 364/200 |
| 4,590,468 | 5/1986 | Stieglitz | 364/200 X |
| 4,680,699 | 7/1987 | Uchino | 364/200 |
| 4,823,305 | 4/1989 | Holdren et al. | 364/900 |

OTHER PUBLICATIONS

"Users Manual of NEC Electron Device UPD7201A", pp. 1-5 and pp. 24-26, issued by Nippon Electric Company in 1984.

Primary Examiner—Gareth D. Shaw
Assistant Examiner—Paul Kulik
Attorney, Agent, or Firm—Fay, Sharpe, Beall, Fagan, Minnich & McKee

[57] ABSTRACT

A microcomputer system comprising a central processor unit, communication apparatus having a first memory to store receipt data, data transfer controller to transfer the receipt data stored in the first memory, a second memory, and counting apparatus, wherein the receipt data consists of at least one unit information item, and the counting apparatus is caused to count up in accordance with a number of the unit information items.

16 Claims, 2 Drawing Sheets

MICROCOMPUTER SYSTEM FOR COMMUNICATION

This is a continuation of co-pending application Ser. No. 07/137,063 filed on Dec. 23, 1987, now abandoned.

BACKGROUND OF THE INVENTION

This invention relates to communication control technology, and more particularly to a technique which is especially effective when applied to the serial communication between microprocessors. By way of example, the technique is effectively utilized for a serial communication device having a DMA (direct memory access) controller which transfers transmission data and reception data between a memory of first-in first-out scheme (hereinbelow, termed "FIFO") and a memory of random access scheme.

Heretofore, an LSI for communication such as $\mu$PD7201A manufactured by Nippon Electric Company has been provided in order to realize a serial communication between microprocessors. FIG. 4 shows an example of a system which uses this communication LSI $\mu$PD7201A. Along with a memory MEM, a DMA controller DMAC and the LSI for serial communication SIO are connected to a microprocessor CPU through a system bus BUS.

In this system, in a case where the microprocessor CPU has data to be transmitted to another microprocessor not shown, it sends a command to the DMA controller DMAC. Then, the DMA controller DMAC delivers addresses onto the system bus BUS and reads out the desired transmission data items in the memory MEM so as to supply them to the communication LSI SIO. The transmission data items supplied to the communication LSI SIO are once stored in a FIFO built therein and are thereafter converted into serial data items, which are output.

On the other hand, when reception data items enter the communication LSI SIO from outside, they are converted into parallel data items every byte, and the parallel data items are stored in a receiving FIFO. When the FIFO is filled up, the communication LSI SIO applies an interrupt to the microprocessor CPU to inform it of the situation. Then, the microprocessor CPU sends a read command to the DMA controller DMAC, and the DMA controller DMAC transfers the receipt data in the FIFO to the memory MEM. Thereafter, the microprocessor CPU accesses the memory MEM, whereby the receipt data can be obtained (refer to "Users Manual of NEC Electron Device $\mu$PD7201A", pp. 1-5 and 24-26, issued by Nippon Electric Company in 1984).

The communication LSI $\mu$PD7201A is an LSI which performs a control conforming to an HDLC (high-level data link control) protocol that transmits data in a unit called "frame". With the protocol which carries out the data communication in frame unit, it is sometimes desired that the microprocessor executes the analysis of receipt data, etc. every received frame. In this regard, the above system employing the communication LSI $\mu$PD7201A is so constructed that, each time final data indicating the end of one frame enters, an interrupt signal is sent to the microprocessor.

However, with the system wherein the microprocessor is interrupted every frame as stated above, when the interrupt shifts a bus mastership to the microprocessor which accordingly executes the process, the transfer of data to the memory MEM by the DMA controller is suspended meantime. As a result, the transfer of the next frame received in the FIFO to the memory MEM becomes impossible, and this forms a cause for lowering the efficiency of communication in the case where a plurality of frames are succesively transmitted to arrive.

SUMMARY OF THE INVENTION

In view of the aforementioned drawback, the inventors studied a system according to which, in the case where the frames are sent in somewhat successively as described above, priority is given to the transfer of the frames received in the FIFO to the memory. That is, at the first stage, all the frames which are successively sent in are received and transferred to the memory MEM. At the next stage, an interrupt is applied from, e.g., the DMA controller to the microprocessor, whereby the microprocessor becomes a bus master in place of the DMA controller and executes the processes for the frames transferred to the memory MEM.

Since the prior-art system does not include the function of counting the number of received frames, the number of frames to be processed by the microprocessor after the end of the transfer of the frames to the memory MEM is not known. In this regard, the inventors' study has revealed that normal analyses might fail to progress because the length of an interrupt request signal or the number of interrupt request signals which, e.g., the DMA controller ought to send to the microprocessor is unknown. Certainly the number of frames can be known in such a way that the microprocessor reads out all the received data items in the memory MEM after the end of the transfer. With such a method, however, a considerably long time is expended merely on the procedure for knowing the number of frames.

An object of this invention consists, in a microcomputer system having a serial communication device which transmits data in frame unit, in reducing an overhead in the reception of data thereby to raise the efficiency of communication and also lightening the burden of a microprocessor thereby to improve the throughput of the system.

The aforementioned and other objects and novel features of this invention will become apparent from the description of the specification as well as the accompanying drawings.

A typical aspect of performance of this invention is summarized as follows: In a case where frames are being received somewhat successively, data transfer to a memory is preferred, and a microprocessor is inhibited from becoming a bus master. In addition, a counter for counting the number of received frames is provided within a system. A count value counted by the counter is counted down each time the microprocessor ends a process for one frame. As a method of acknowledging that the frames are being received somewhat successively, there is considered, for example, one which decides the successive reception whenever any received frame exists in a FIFO. This method is based on the view that the existence of any received frame in the FIFO in spite of the continuation of the operation of transferring a received frame from the FIFO to the memory will demonstrate the somewhat successive reception of frames.

According to the above expedient, while the reception of a series of frames continues, the frame is transferred to the memory by a DMA controller, and the processing of the frame or frames in the memory by the microprocessor is started after the reception of the final frame. Thus, the interrupt process of the microprocessor as incurs the suspension of the DMA transfer can be prevented to raise the communication efficiency. In addition, when the microprocessor is to analyze communication data after the reception of the series of frames, the number of the received frames is immediately known from the value of the counter, whereby the object of lightening the burden of the microprocessor to improve the throughput of the system can be accomplished.

As a method of acknowledging that the final frame among the series of successive frames has been received, there is considered, for example, one which decides the reception of the final frame when no receipt data has come to exist in the FIFO. It demonstrates the end of the reception of the series of frames that, as the result of the successive transfer of the frame data in the FIFO to the memory, no data has come to exist in the FIFO storing the received frames therein.

DESCRIPTION OF THE PREFERRED EMBODIMENTS

Figure 1:
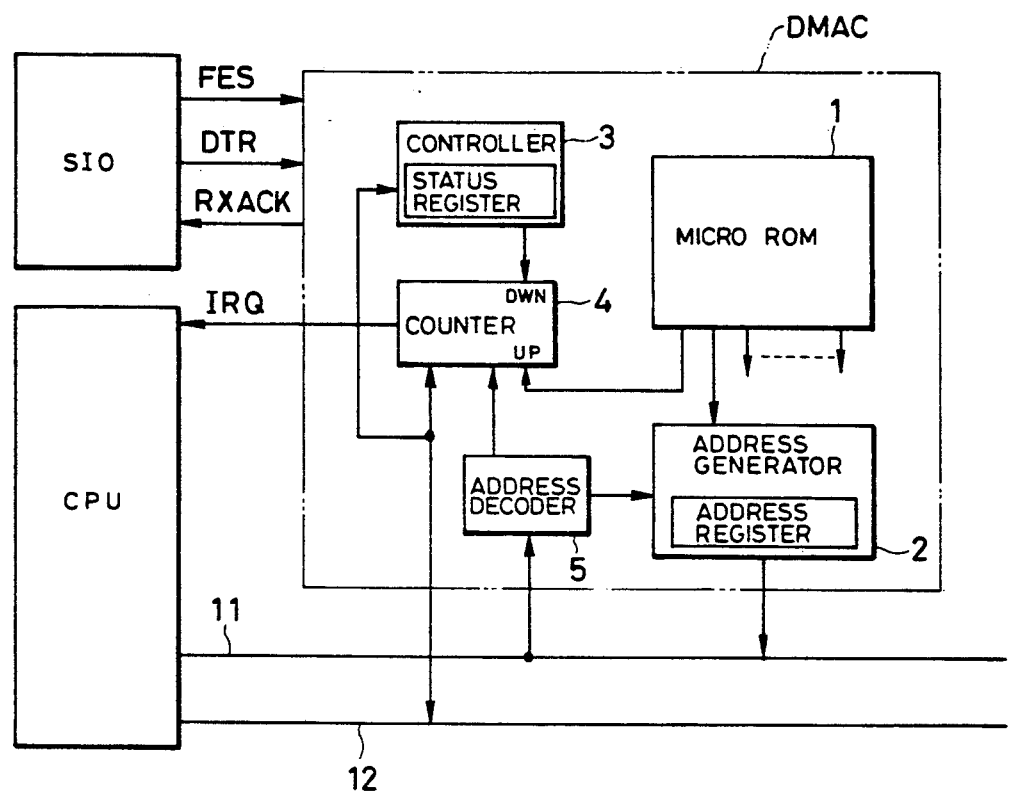
FIG. 1 is a block diagram, showing an embodiment of a DMA controller which constitutes a serial communication device according to the present invention.

Shown in FIG. 1 is an embodiment of a DMA controller which constructs a microcomputer system having a serial communication function, conjointly with an LSI (SIO) for a communication control conforming to an HLDC protocol.

The DMA controller of this embodiment includes a micro ROM (read only memory) 1, an address generator 2 for generating the address of a memory to which data is to be transferred, and a controller 3 having a control register, a status register, etc. and operating, e.g., for determining operation modes in the DMA controller. The micro ROM 1 stores therein a microprogram which consists of a series of microinstructions for executing, e.g., the DMA transfer of receipt data from a receiving data FIFO built in the communication controller SIO to the memory on a host computer side. Control signals for various portions within the DMA controller are generated on the basis of the microinstructions read out.

When a DMA transfer request signal DTR enters the DMA controller DMAC from the communication controller SIO, the micro ROM 1 is started to read out the series of corresponding microinstructions, according to which the address generator 2 is controlled so as to successively generate destination addresses indicative of data transfer goals and deliver them onto the address bus 11 of the system (on this occasion, the head address of a data storing region prepared in the memory is previously set in a register built in the address generator 2 by a microprocessor CPU). Simultaneously with the output of the addresses, the DMA controller DMAC sends an acknowledge signal RXACK to the communication controller SIO. Then, receipt data items in an amount of one frame are automatically read out from the FIFO in the communication controller SIO and delivered onto a data bus 12. The receipt data read out from the FIFO may well be once loaded in the DMA controller and thereafter transferred to the memory. In this embodiment, however, the destination addresses are output from the DMA controller onto the address bus 11 in correspondence with the output of the receipt data in the FIFO onto the data bus 12. In consequence, the data items on the data bus 12 are directly stored in the memory on the host computer side.

Moreover, this embodiment is provided with a counted circuit 4 which counts the number of receipt frames. When a frame end signal FES is supplied from the communication controller SIO to the DMA controller, the micro ROM 1 produces a frame end management signal, in response to which the counter circuit 4 performs a countup operation. By way of example, this counter circuit 4 takes the logical sum of the bits thereof and delivers it as an interrupt request signal IRQ for the microprocessor CPU. Besides, the counter 4 can be externally read out by the microprocessor CPU at any time. To this end, an address decoder 5 is disposed in the DMA controller. Incidentally, the DMA transfer request signal DTR is rendered, for example, a high level in a case where the receipt data is held stored in the FIFO within the communication controller SIO. Thus, the transfer request for the DMA controller DMAC is generated. On the other hand, in a case where the receipt data is not held stored in the FIFO, the DMA transfer request signal DTR is rendered a low level. Thus, the transfer request for the DMA controller DMAC is extinguished.

In the microcomputer system with the serial communication function which employs the DMA controller of this embodiment, the interrupt request signal IRQ provided from the DMA controller DMAC is treated as a signal which is lower in the priority, level than the DMA transfer request signal DTR provided toward the DMA controller DMAC. Thus, even when the frame end signal FES supplied from the communication controller SIO to the DMA controller causes the counter 4 to count up and to produce the interrupt request signal IRQ, the DMA transfer request signal DTR is preferred in the presence of the next receipt frame, and a process such as the analysis of the receipt data by the microprocessor CPU is not started. That is, in the system of this embodiment, the interrupt process by the microprocessor CPU is comprehensively executed after the final frame has arrived from a communication line to end the pertinent transfer and to release the state in which the DMA controller occupies the buses. Unlike the prior-art system, therefore, the reception of the frames is not suspended midway, and the communication efficiency is enhanced.

Though not especially restricted, the DMA controller DMAC of this embodiment is so constructed as to perform the DMA transfer control with it stipulated as one condition that an enable bit provided in the status register of the controller 3 is set to "1" by the microprocessor CPU. For example, the enable bit is set to "1" in such a way that the head address of the region where the data to be transferred by the DMA controller DMAC is stored is set in the register within the address generator 2.

Figure 2:
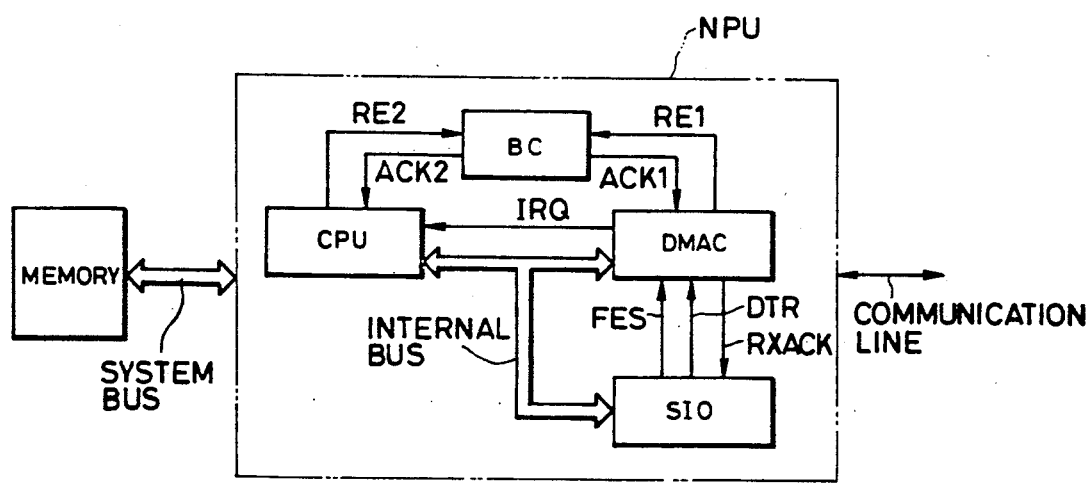
FIG. 2 is a block diagram showing an example of a serial communication system to which the present invention is applied.

FIG. 2 shows another embodiment of this invention. In this embodiment, a microprocessor CPU, a DMA controller DMAC, a communication controller SIO and a bus controller BC are formed on an identical semiconductor substrate. The single-chip semiconductor constructs a communication or network controlling processor NPU. Control signals provided between the DMA controller DMAC and the communication controller SIO or the microprocessor CPU, namely, a frame end signal FES, a DMA transfer request signal DTR, an acknowledge signal RXACK and an interrupt request signal IRQ serve similarly to the control signals of the same symbols shown in FIG. 1, respectively. In this embodiment, the bus controller BC for an internal bus is disposed within the communication controlling processor NPU. This bus controller BC receives a bus occupancy request signal RE1 from the DMA controller DMAC, and returns an acknowledge signal ACK1 to the DMA controller DMAC when it acknowledges the request. In addition, it receives a bus occupancy request signal RE2 from the microprocessor CPU and returns an acknowledge signal ACK2 to the microprocessor MPU when it acknowledges the request. In a case where the bus occupancy request signals RE1 and RE2 are simultaneously generated, the acquisition of a bus mastership by the DMA controller DMAC is preferred. In this embodiment, the thus occupancy request signal RE1 is generated in response to the generation of the DMA transfer request signal DTR, while the bus occupancy request signal RE2 is generated in response to the generation of the interrupt request signal IRQ.

Figure 3:
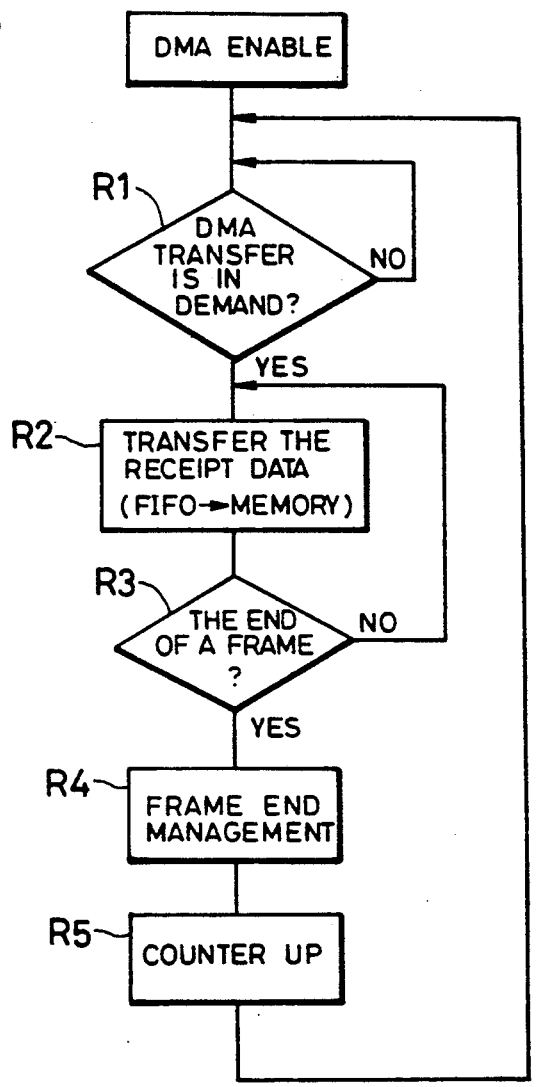
FIG. 3 is a flow chart showing an example of frame transfer routines by the DMA controller according to the present invention.
Figure 4:
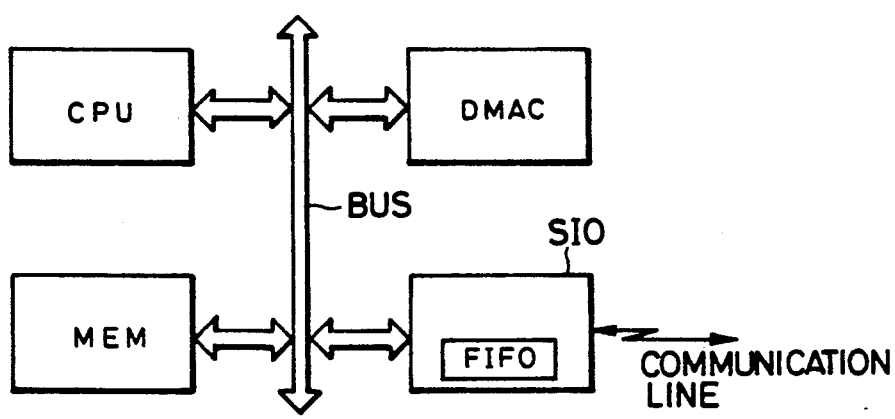
FIG. 4 is a block diagram showing an example of arrangement of a microcomputer system which has a serial communication device composed of a communication controller and a DMA controller.

FIG. 3 exemplifies the routines of the frame receiving process based on the microprogram within the DMA controller DMAC in each of the foregoing embodiments.

When the enable bit provided in the status register within the controller 3 is "1", the DMA controller first decides whether or not the DMA transfer request signal DTR has been received from the communication controller SIO (routine R1). In the presence of the DMA transfer request, the DMA controller reads out one byte of the receipt data stored in the FIFO in byte unit and transfers it to the memory (routine R2). Subsequently, the DMA controller checks the frame end signal FES to decide whether or not a frame has ended (routine R3). Here, when it is decided that the frame has not ended, the process returns to the routine R2 to repeat the transfer of data again. When the frame has ended in due course, a frame end management routine R4 is executed, and the counter 4 is caused to count up (routine R5). Then, the process returns to the routine R1 again, and the above operations are repeated. Here, the "frame end management routine" is intended to mean, for example, the operations of checking whether or not an error is contained in the receipt data, discriminating the sort etc. of the error, and storing the results in a status register (not shown) within the communication controller SIO.

The counter circuit 4 in the foregoing embodiment is so constructed as to count down, for example, in such a way that the microprocessor CPU writes "1" into a frame end bit provided in the status register within the controller 3.

When the reception of the series of frames has ended, the bus mastership shifts to the microprocessor CPU, by which the analysis of the receipt data, etc. are performed. The end of the reception of the series of frames can be judged from the fact that the receipt data items stored in the FIFO within the communication controller SIO have been entirely transferred to the memory to empty the FIFO. Subsequently, when the frame process of one frame by the microprocessor CPU has ended, "1" is written into the frame end bit, and the counter 4 in the DMA controller DMAC is caused to count down. Meantime, the interrupt request signal IRQ for the microprocessor continues to be supplied until the value of the counter becomes "0". Therefore, the microprocessor recognizes that the process has not ended up to the final frame yet, and it shifts to the process of the next frame.

In this manner, according to the embodiment, even when the DMA controller has successively performed the transfer processes of the plurality of receipt frames, the microprocessor can repeat the frame processes such as the analyses of the receipt data in the number of the frames after the completion of the transfer. Accordingly, the microprocessor can accurately know the number of the frame end interrupts or the period of time necessary for the interrupt process without decoding a status after each transfer process in search of the tail of the frame, even when the receipt frames have been transferred in succession. Therefore, such a procedure for confirming the number of the frames need not be taken, and the throughput of the system is improved.

Although, in the above embodiment, only the receiving functions of the communication controller SIO and the DMA controller DMAC have been described, usually transmitters are also provided within the LSI's of these controllers, and the present embodiment is not exceptional.

As described above, according to the embodiment, in a microcomputer system having a serial communication device which transmits data in frame unit, a counter which counts frame end signals is disposed in a DMA controller DMAC which transfers data to a memory from a FIFO storing the data of received frames therein. While the count value of this counter is "1" or above, a microprocessor CPU is continuously supplied with an interrupt request signal IRQ which is lower in the priority level than a DMA transfer request signal DTR. Therefore, while the reception of a series of frames continues, the frames are accepted and are transferred to the memory by the DMA controller. In addition, the interrupt processes of frames by the microprocessor are started after the reception of the series of frames. In this case, the count value having been counted by the counter is counted down each time the microprocessor ends its process for one frame. Thus, the suspension of DMA transfer attendant upon the interrupt process of the microprocessor is prevented, and this operation brings forth the effect that the communication efficiency is raised. Moreover, when the microprocessor is to analyze the communication data after the end of the reception of the series of frames, it can immediately know the number of the receipt frames from the value of the counter, and this operation brings forth the effect that the burden of the microprocessor is lightened to enhance the throughput of the system.

Although, in the above, the invention made by the inventors has been concretely described in conjunction with embodiments, it is needless to say that the present invention is not restricted to the foregoing embodiments, but that it can be variously modified within a scope not departing from the purport thereof. For example, the counter for counting the number of receipt frames is disposed in the DMA controller MAC, but it may be disposed in any other place without being restricted thereto.

Besides, the embodiments have been described by way of example as to the case of application to the serial communication device conforming to the HDLC protocol. However, the communication protocol is not restricted to the HDLC, but the invention is similarly applicable to a serial communication device conforming to a protocol of any other type in which a series of communication data items are divided into a plurality of groups that are then transmitted.

Although the invention made by the inventors has thus far been principally described as to the application to the DMA controller for the serial communication forming the background field of utilization, this invention is not restricted thereto but can be utilized for general DMA controllers.

What is claimed is:

1. A microcomputer system having an improved communications function with an operatively associated external microprocessor, the microcomputer system comprising:
    communication means for communicating with said associated external microprocessor, the communication means comprising: i) means for receiving data from said associated external microprocessor, the data comprising a quantity of frames of information, each of the frames having a first quantity of data words, ii) first memory means for storing the received data, iii) means for generating a data transfer request signal when the data is received and stored in the first memory means, the data transfer request signal being extinguished in an absence of said data in the first memory means and iv) means for generating a frame end signal every time a frame of said data is stored into the first memory means;
    data transfer means connected to said communication means and responsive to reception of the data transfer request signal and the frame end signal for removing the data stored in said first memory means and transferring the removed data to an associated external second memory means;
    count means connected to said data transfer means for counting a quantity of frames of information received into said first memory means according to the frame end signal, the quantity of frames of information being represented as a count value, and for generating an interrupt request signal in response to a non-zero count value;
    processor means connected to said data transfer means and responsive to a predetermined status of the interrupt request signal, the data transfer request signal, and the count value stored in the count means, for processing the data stored in said associated external second memory means and for decrementing said count value for every frame of data processed, said predetermined status being a presence of the interrupt request signal and an absence of the data transfer request signal; and,
    bus control means, connected to said processor means, said data transfer means and said associated external second memory means, for controlling possession of a mastership of a bus which is shared among said processor means, said data transfer means and said associated external second memory means, said bus control means comprising means for giving priority to the data transfer means for transferring the data stored in the first memory means to the associated external second memory means, over the processor means for processing the data stored in the second memory means when the data request signal is generated by the communication means.

2. The microcomputer system according to claim 1, wherein said processor means generates a bus mastership request signal for requesting said bus control means to grant the bus mastership on the basis of the interrupt request signal, and said communication means generates a bus mastership request signal for requesting said bus control means to grant the bus mastership, when data is stored in said first memory means.

3. The microcomputer system according to claim 1 wherein:
    said first memory means is a first-in firstout buffer memory,
    said communication means functions to convert serial data received through a transmit/receive communication line into parallel data and the store the parallel data in said first memory means, and
    said data transfer means is a direct memory access controller.

4. The microcomputer system according to claim 3, wherein said count means is provided in said direct memory access controller.

5. A microcomputer system for improving the efficiency of communication with an associated external microprocessor by prioritizing the communication over data processing, the microcomputer system comprising:
    communication controller means for receiving from the external microprocessor first data into the system comprised of frames of information, the communication controller means including a first memory buffer means for temporarily storing the received first data therein, the first memory buffer means being capable of storing at least a frame of information, the communication controller means generating a data transfer request signal in response to storage of the received first data and further generating a frame end signal in response to each reception of the at least one frame of information into the first memory buffer means;
    second memory means, operatively associated with the first memory buffer means, for storing second data;
    data transfer means connected to the communication controller and the second memory means and responsive to the data transfer request signal, for removing the received first data from the first memory buffer means and transferring the removed first data to the second memory means as the second data and for generating an interrupt request signal when all of the received first data is transferred from the first memory buffer means to the second memory means as the second data;
    central processing unit means connected to the second memory means and the data transfer means for processing the second data stored in the second memory means responsive to the interrupt request signal, the central processing unit means executing a predetermined operation each time one frame of information is processed; and,
    counter means operatively associated with the communication controller means and the central processing unit means for indicating a number of frames of the second data to be processed by the central processing unit means at a count value, the counter means performing a count up operation is response to each reception of the frame end signal and performing a countdown operation in response to each predetermined operation executed by the central processing unit means, the count value being selectively read by the central processing unit means to determine the number of frames of information to be processed.

6. The microcomputer system according to claim 5 wherein said central processing unit means comprises means for processing all of said frames of information transferred to said second memory means in response to the count value.

7. The microcomputer system according to claim 6, further comprising:
   internal bus means for sharing data among said central processing unit means, said communication controller means, said data transfer means, said first memory buffer means and said second memory means; and,
   bus control means for resolving bus contention among said central processing unit means, said communication controller means, sand said second memory means, the bus control means granting priority to the data transfer means for controlling transfer at the data from the first memory buffer means to the second memory means, over the central processing unit means for processing said second data stored in the second memory means.

8. The microcomputer system according to claim 7 wherein said central processing means further includes a first bus occupancy request signal means responsive to said count value for requesting control of said internal bus means; and,
   wherein said communication controller means further includes a second BUS occupancy request signal means responsive to the reception of the first data in the first memory buffer means for requesting control of said internal bus means.

9. The microcomputer system according to claim 7,
   a) wherein said first memory means comprises a first-in first-out buffer, and
   b) wherein said communication controller means further comprises means for transforming the received first data comprised of preselected data length units into parallel data and means for storing the parallel data in said first memory buffer means according to a first-in first-out scheme, and
   c) wherein said data transfer means is a direct memory access controller.

10. The microcomputer according to claim 9, wherein said data transfer means includes the counter means.

11. The microcomputer system according to claim 5, wherein said counter means further includes an interrupt request signal means responsive to the presence of a non-zero count value for interrupting the central processing unit means.

12. The microcomputer system according to claim 11, further comprising means for prioritizing the data transfer request signal over the interrupt request signal, whereby transfer of all of the first data in the first memory buffer means to the second memory means by the data transfer means takes places before the processing of the second data stored in the second memory means by the central processing unit means.

13. A method of operating a microcomputer system for improved efficiency of serial communication between the system and an operatively associated external microprocessor, the method comprising the steps of:
   receiving serial data comprising data length units from the external microprocessor into a communication controller of the system;
   converting the serial data into parallel data within the communication controller of the system;
   generating a data transfer request signal from the communication controller in response to the reception of the serial data;
   generating a frame end signal from the communication controller in response to each reception of each data length unit of said serial data into said communication controller;
   transferring the parallel data from the communication controller to a second memory means of the microcomputer system as second data;
   processing the second data stored in the second memory means by an internal microprocessor of the system according to a predetermined operation after all of said parallel data has been transferred from the communication controller to the second memory means;
   performing a count operation on the counter of the microcomputer system in response to reception of each frame end signal;
   performing a countdown operation on the counter of the microcomputer system in response to each predetermined operation executed by the central processing unit; and,
   reading the count value by the internal microprocessor to determine the number of preselected data length units in the second memory means to be processed.

14. A communication microprocessor apparatus operable for receiving communication data and providing the received communication data to an associated external memory device as saved data, the apparatus comprising:
   communication controller means for receiving the communication data, the communication controller means including a memory buffer means for storing increments of the received communication data as first buffered data, the communication controller providing a data transfer request signal in response to storage of the received communication data and further providing a frame end signal each time a quantity of communication data is received and stored as said first buffered data, the quantity of communication data representing a frame of said first buffered data;
   direct memory access controller means, connected to the communication controller means and responsive to the data transfer request signal, for transferring all of the stored first buffered data in the memory buffer means to the associated external memory device as said saved data;
   central processing unit means, connected to the direct memory access controller means and responsive to all of said stored first buffered data being transferred to the associated external memory device, for processing the saved data stored in the associated external memory device and for executing a predetermined operation when each frame of saved data is processed; and counter circuit means connected to the communication controller means, the direct memory access controller means and the central processing unit means for indicating a number of frames of saved data to be processed by the central processing unit means, the number being reflected as a count value, the counter circuit means performing a count up operation upon receipt of each frame end signal and performing a countdown operation in response to each predetermined operation executed by the central processing unit means, the count value comprising a plurality of bits selectively readable by the central processing unit means to recognize the number of preselected data length units to be processed.

15. The communication microprocessor apparatus according to claim 14 wherein the communication controller means further comprises means for receiving serial data as said communication data and means for storing said increments of said first buffered data as parallel data, and wherein the direct memory access controller means comprises means for transferring to the associated external memory device said saved data as parallel data.

16. The communication microprocessor apparatus according to claim 15 wherein the communication controller means, the direct memory access controller means, the central processing means and the counter circuit means are all formed on a single semiconductor substrate.

* * * * *